United States Patent
Hamade et al.

(10) Patent No.: US 11,384,251 B2
(45) Date of Patent: Jul. 12, 2022

(54) HYDROPHILIC COATING MATERIAL, METHOD OF PRODUCING HYDROPHILIC COATING FILM, AND INKJET RECORDING HEAD

(71) Applicant: CANON KABUSHIKI KAISHA, Tokyo (JP)

(72) Inventors: Yohei Hamade, Tokyo (JP); Satoshi Tsutsui, Yokohama (JP); Isamu Horiuchi, Yokohama (JP); Kazunari Ishizuka, Suntou-gun (JP); Miho Ishii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 195 days.

(21) Appl. No.: 16/911,173

(22) Filed: Jun. 24, 2020

(65) Prior Publication Data
US 2020/0407583 A1    Dec. 31, 2020

(30) Foreign Application Priority Data

Jun. 26, 2019   (JP) .............................. JP2019-118519

(51) Int. Cl.
*C09D 105/04*    (2006.01)
*B41J 2/16*    (2006.01)
*C09D 7/65*    (2018.01)

(52) U.S. Cl.
CPC ............ *C09D 105/04* (2013.01); *B41J 2/162* (2013.01); *C09D 7/65* (2018.01); *B41J 2202/22* (2013.01)

(58) Field of Classification Search
CPC . C09D 105/04; C09D 7/65; C09D 5/00; B41J 2/162; B41J 2202/22; B41J 2/1603; B41J 2/1606; B41J 2/1626; B41J 2/1631; B41J 2/1639; B41J 2/1645; C08L 5/04
See application file for complete search history.

(56) References Cited

U.S. PATENT DOCUMENTS

2009/0069506 A1*  3/2009  Shimada ................. C08L 1/286
                                                                525/418

FOREIGN PATENT DOCUMENTS

JP          H03-215589 A      9/1991

OTHER PUBLICATIONS

IP.com search (Year: 2022).*

* cited by examiner

*Primary Examiner* — Lisa Solomon
(74) *Attorney, Agent, or Firm* — Canon U.S.A., Inc., IP Division

(57) ABSTRACT

A hydrophilic coating material including an alginic acid compound and a resin, in which the alginic acid compound is granulated and dispersed in the resin. In a coating film using the material, it is preferred that the granulated alginic acid compound is exposed on the surface. Such a hydrophilic coating film is suitable as a hydrophilization treatment film of a nozzle face surface of an inkjet recording head.

20 Claims, 2 Drawing Sheets

HYDROPHILIC COATING MATERIAL, METHOD OF PRODUCING HYDROPHILIC COATING FILM, AND INKJET RECORDING HEAD

BACKGROUND OF THE INVENTION

Field of the Invention

The present disclosure relates to a hydrophilic coating material, a method of producing a hydrophilic coating film, and an inkjet recording head.

Description of the Related Art

In recent years, a technique for hydrophilizing a surface of a base material has been demanded mainly in industries such as the paint and film fields. By hydrophilizing the surface of a base material, functions such as an antifogging property, an antistatic property, and an antifouling property can be imparted. In particular, in the field of inkjet printers, an increase in the degree of freedom of ink which, for example, can correspond to various inks can be expected by performing hydrolization as a treatment of an ejection port surface (nozzle face surface) of an inkjet recording head.

Various methods have been developed as a hydrolization treatment method. As a physical surface treatment method, a method such as a corona treatment, a plasma treatment, or an ultraviolet treatment is known. Further, as a chemical treatment method, a surface modification method using sulfuric acid, nitric acid, liquid fumed sulfuric acid, gaseous sulfur trioxide, or the like is known. Japanese Patent Application Laid-Open No. H03-215589 discloses a method of forming an antifogging coating by curing a liquid hydrophilic material such as a surfactant by combining it with a (meth)acrylic ester-based hydrophilic monomer.

SUMMARY OF THE INVENTION

The present disclosure relates to a hydrophilic coating material including an alginic acid compound and a resin, in which the resin is selected such that a cured product of the resin alone has a water contact angle of 40° or more. In particular, the present disclosure relates to a hydrophilic coating material in which an alginic acid compound is granulated and dispersed in the resin.

Further features of the present disclosure will become apparent from the following description of exemplary embodiments with reference to the attached drawings.

DESCRIPTION OF THE EMBODIMENTS

Figure 1A:
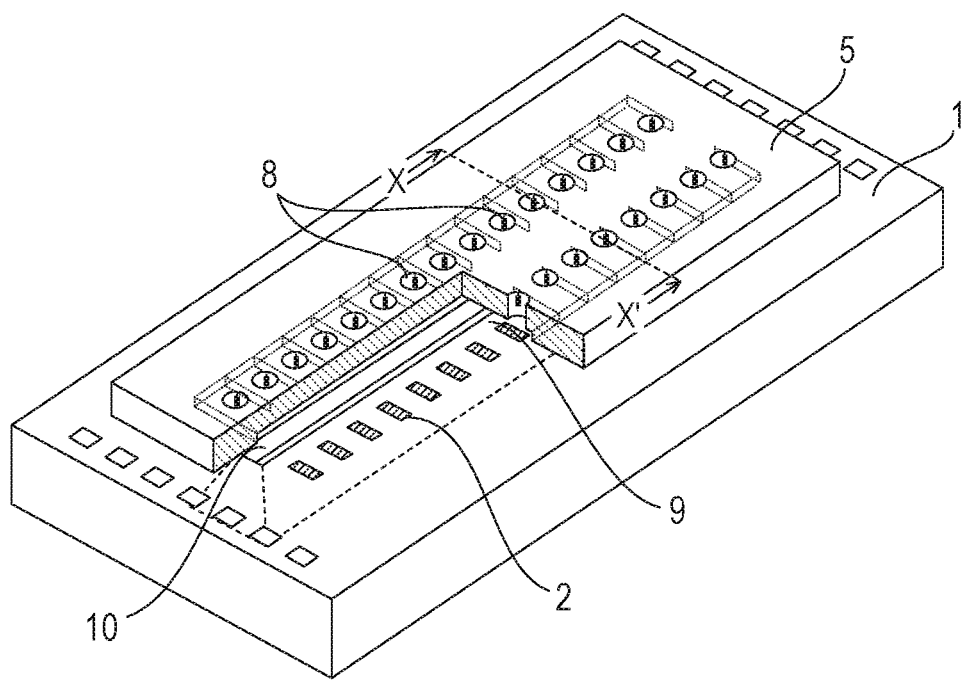
FIG. 1A is a partially cutaway perspective view of an inkjet recording head according to the present disclosure.

According to the study of the present inventors, the conventional hydrophilization treatment method has the following disadvantages. First, the above physical and chemical treatment methods have a disadvantage that an orientation of a hydroxyl group becoming a hydrophilic group is destroyed over time, and hydrophilicity thereof is degraded. Further, a hydrophilization treatment method using a surfactant as described in Japanese Patent Application Laid-Open No. H03-215589 has a disadvantage that a bleed-out of a surfactant occurs due to external factors such as rubbing of a cured film surface, and hydrophilicity is not maintained. When a large amount of surfactant is used for improving initial hydrophilicity, swelling of the resin due to moisture absorption, a decrease in mechanical strength, and the like are likely to occur.

Such a regression of hydrophilicity over time and a decrease in the mechanical strength make it difficult to apply the method to the use requiring maintenance of long-term hydrophilicity and mechanical strength, such as a nozzle face surface of an inkjet recording head.

An aspect of the present disclosure is to provide a hydrophilic coating material which can provide a coating film having excellent hydrophilicity and excellent persistence of mechanical strength and hydrophilicity.

The hydrophilic coating material according to the present disclosure includes an alginic acid compound and a resin, and is characterized in that a cured product of the resin alone has a water contact angle of 40° or more. Preferably, the alginic acid compound is granulated and dispersed in the resin.

The alginic acid compound is a hydrophilic polymer having a very high water-holding property and high hydrophilic persistence, and is effective as a hydrophilic material, but since alginic acid compound is a flexible gel-like material, it has poor durability when formed into a film.

Therefore, in the present disclosure, a hydrophilic coating material obtained by granulating the alginic acid compound and dispersing it in a resin is prepared, and a hydrophilic coating film is formed by the material. That is, by embedding particles of the alginic acid compound in a cured film obtained by curing the resin, a mechanical strength is imparted while the functions of hydrophilicity and hydrophilic persistence of the alginic acid compound are maintained. In general, an affinity between the alginic acid compound (particularly, an alginate described later) and an organic resin is not high, but the affinity can be improved by coating fine particles of the alginate as core particles with a saccharide. Hereinafter, an embodiment in which core-shell particles containing an alginate are manufactured will be described as an example.

In addition, by forming the alginic acid into an alginate containing a divalent metal cation, the mechanical strength is remarkably improved. This improvement of the mechanical strength is due to two alginic acid molecules ionically crosslinking at a plurality of points through divalent metal cations, for example, calcium ions.

Furthermore, in providing the hydrophilic coating material according to the present disclosure, it is necessary to uniformly disperse the alginic acid compound, particularly the granulated alginic acid compound in the resin without impairing the hydrophilicity. An embodiment of improving the dispersibility will be described in detail below.

The method of producing a hydrophilic coating material according to the present embodiment includes the following steps:

(A) a step of obtaining core-shell particles having a core containing an alginic acid compound and a shell containing a saccharide, and (B) a step of obtaining a hydrophilic coating material (a resin solution for manufacturing a cured film) including the core-shell particles obtained in step (A).

(A) Step of obtaining core-shell particles having core containing alginic acid compound and shell containing a saccharide

[Fine Particles of Alginic Acid Compound]

In the step of obtaining core-shell particles, first, fine particles of a compound having an alginic acid structure are obtained. The compound is preferably an alginate containing a divalent metal, in order to enhance the properties such as mechanical strength of the particles themselves and dimensional stability under moistness. The alginate containing a divalent metal exhibits the properties by carboxyl groups in two or more alginic acid molecules being ionically cross-linked through a divalent metal ion. In particular, among the divalent metal ions, a strontium ion and a calcium ion having high reactivity with the alginic acid are preferably used.

The particle diameter of the core-shell particles is preferably equal to or less than the thickness of the cured film to be formed in consideration of dispersing and embedding the particles in the cured film described later. For example, in the case of a use for a hydrophilic coating film on the nozzle face surface of an inkjet recording head, the particle diameter is preferably 10 μm or less. The particle diameter in the present disclosure is a volume average primary particle diameter measured by a dynamic light scattering method.

The fine particles of the alginic acid compound serving as the core may be commercially available products or manufactured by synthesis from raw materials as long as the particles satisfy the intended use. As the commercially available product, calcium alginate beads known as the trade name "Flavica Fine" (manufactured by Nisshinbo Chemical Inc.) are preferably used, and the grade can be appropriately selected according to the use. An addition amount of the alginic acid compound particles is preferably 1 to 20 parts by mass with respect to 100 parts by mass of a resin described later. When the amount is 1 part by mass or more, hydrophilicity is sufficiently exhibited, while when the amount is 20 parts by mass or less, curing of the resin is hardly inhibited.

[Core-Shell Particles]

Next, the core particles of the alginic acid compound are coated with a saccharide to obtain core-shell particles. As the saccharide, a saccharide having an amino group is preferred. This is because the amino group binds to a carboxyl group in alginic acid by electrostatic attraction to coat the core particles. The carboxyl group in alginic acid expresses hydrophilicity, but it is also preferred that the carboxyl group is in a state of remaining by binding by electrostatic attraction. In addition, examples of the saccharide having an amino group include aminosugars and chitosan such as N-acetylneuraminic acid, phosphoribosylamine, glucosamine, N-acetylmuramic acid, neuraminic acid, galactosamine, meglumine, muramyl dipeptide, N-acetylgalactosamine, and N-acetylglucosamine. In particular, the saccharides having a small number of hydroxyl groups in the molecule are preferred, in consideration of affinity with the resins described later. Among the above saccharides, saccharides having a hydroxyl value in monosaccharides or a hydroxyl value in a monomer unit in polysaccharides of 3 or less are preferred. Specifically, phosphoribosylamine and chitosan are preferred. A thickness of the shell is not particularly limited, and it can be formed in a range from a very thin film thickness of approximately a monolayer to several molecular layers of the saccharide to a thickness not impairing the hydrophilicity of the core particles. The saccharide constituting the shell may cover the entire alginic acid compound particles as the core particle, or may partially cover the surface of the alginic acid compound particles. The core-shell particles include the meaning of alginic acid compound particles which are surface-modified with the saccharide. The thickness of the shell is preferably in a range of several nm to several hundred nm. The thickness of the shell can be confirmed by observation of the cross section of the obtained core-shell particles, comparison of the particle diameter of the core particles with the particle diameter of the core-shell particles, and the like. When the shell thickness is small, the particle diameter of the core particles and the particle diameter of the core-shell particles may be substantially the same. Further, the thickness of the shell can be appropriately changed by adjusting the processing time in the following production method.

As the method of producing core-shell particles, the core particles of the alginic acid compound are immersed in a solution in which a saccharide is dissolved, and are sufficiently shaken to be dispersed. The obtained dispersion is heated under pressure in an apparatus capable of high-temperature and high-pressure processing such as an autoclave, taken out, and dried, thereby obtaining the particles.

(B) Step of Obtaining Hydrophilic Coating Material Including Core-Shell Particles In the step of manufacturing the hydrophilic coating material, a solution in which the core-shell particles are mixed with a resin, a curing catalyst, and the like (hereinafter, sometimes referred to as a "resin solution"), is prepared.

Any resin can be used as long as the resin has a water contact angle of a cured product of the resin alone of 40° or more, but a curable resin is preferred, and both a thermocurable resin and a photocurable resin can be used. The resin having a water contact angle of the cured product of the resin alone of 40° or more is understood to be a resin to which alginic acid compound particles need to be added to increase hydrophilicity. In order to suppress a decrease in hydrophilicity due to external factors, a resin having a high mechanical strength is preferred. Further, in the case of a resin having a very low hydrophilicity (water-repellent resin), required hydrophilicity may not be exhibited in some cases, even if the alginic acid compound particles are added. Therefore, the water contact angle of the cured product of the resin alone is preferably less than 90°, and more preferably 80° or less. Specific examples of the thermocurable resin include an epoxy resin, a phenol resin, and the like. In particular, it is preferred that the resin can be cured without using a strong base in a curing agent, so as to minimize the reaction with the carboxyl group of alginic acid exhibiting hydrophilicity. As the epoxy resin, a resin containing an alicyclic group or an aromatic group is preferred, and as the phenol resin, a resol type phenol resin is preferred. These resins can be used alone or in combination of two or more.

Specific examples of the photocurable resin include a photocurable epoxy resin and a photocurable vinyl ester resin (including an acrylic resin). These resins can be used alone or in combination of two or more.

Examples of the photocurable epoxy compound include an alicyclic type epoxy resin, a bisphenol A type epoxy resin, and a novolak type epoxy resin. Examples of the compound satisfying the above include an epoxy resin derived from vinylcyclohexene dioxide of the following Formula (1) and a bisphenol A type and novolak type epoxy resin of the following Formula (2):

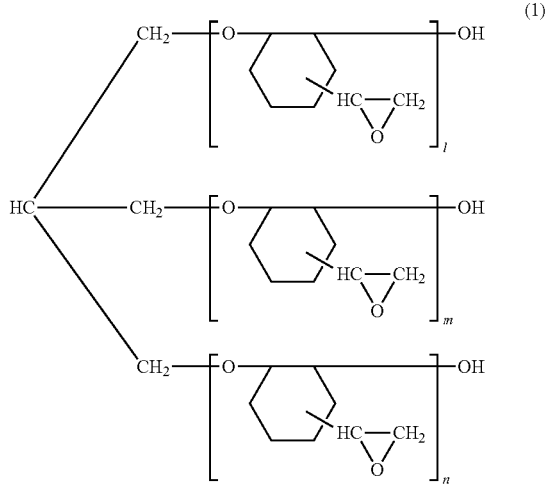

(1)

wherein l, m, and n are all integers of 1 or more,

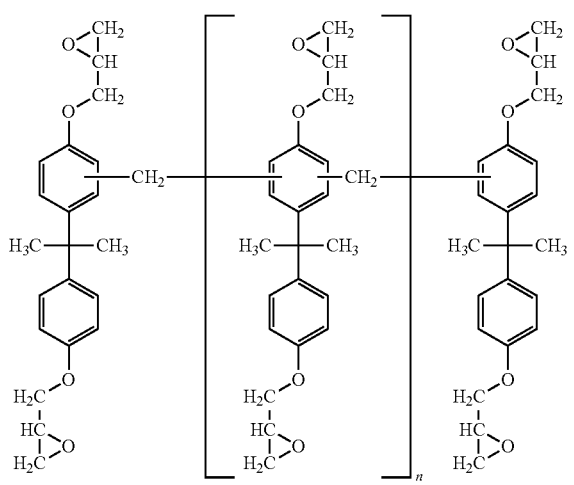

(2)

wherein n is an integer of 0 or more.

The commercially available products include "EHPE3150" (trade name, manufactured by Daicel Corporation), "Celoxide 2021" (trade name, manufactured by Daicel Corporation), "GT-300 series" (trade name, manufactured by Daicel Corporation), "GT-400 series" (trade name, manufactured by Daicel Corporation), "157S70" (trade name, manufactured by Mitsubishi Chemical Corporation), "Epicron N-865" (trade name, manufactured by DIC Corporation), "SU-8 3000" (trade name, negative type photoresist, manufactured by Nippon Kayaku Co., Ltd.), and the like. The epoxy equivalent of the epoxy compound is preferably 2000 or less, and more preferably 1000 or less. When the epoxy equivalent is 2,000 or less, the crosslink density does not decrease during the curing reaction, and a decrease in the glass transition temperature and close adhesion of the cured product can be prevented. The epoxy equivalent is a value measured according to JIS K-7236.

Further, the hydrophilic coating material according to the present disclosure may include at least one of a curing catalyst or crosslinking agent for curing the resin. As the curing catalyst of the thermocurable resin, polyaddition type catalysts such as acid anhydride-based or phenol-based catalysts, or non-basic curing catalysts such as polymerization type catalysts can be used. Specifically, methyl tetrahydrophthalic anhydride, (methyl) hexahydrophthalic anhydride, and the like are preferably used. Further, as a curing catalyst of the photocurable resin, a photoacid generator, a photocationic polymerizer, a photoradical generator, and the like can be used. Specifically, [4-(4-acetyl)phenylthio]phenyldiphenylsulfonium tetrakis (pentafluorophenyl) borate, 2,2-dimethoxy-2-phenylacetophenone, and the like are preferably used. Examples of the commercially available products include "ADEKA OPTOMER" (registered trademark) SP series (manufactured by ADEKA Corporation).

Further, a crosslinking agent may be used, for increasing the mechanical strength of the cured product. As the crosslinking agent, a silane agent is preferably used. Examples of the commercially available product include "SILQUEST A-187J" (trade name, manufactured by Momentive Performance Materials, Inc.), which is an epoxy-based silane coupling agent. These crosslinking agents are also a non-basic crosslinking agent as described above.

A blending amount of the curing catalyst or the crosslinking agent is 0.1 to 30 parts by mass, and more preferably 1 to 10 parts by mass, with respect to 100 parts by mass of the resin. When the blending amount of the curing catalyst or the crosslinking agent in the resin solution is less than 0.1 parts by mass, the blending amount thereof may be too small, and the effect of blending the curing catalyst or the crosslinking agent may be insufficient. When the blending amount of the curing catalyst or the crosslinking agent in the resin solution is more than 30 parts by mass, the amount of the curing catalyst or the crosslinking agent is too large, and the additive component may be bled from the cured product. When both the curing catalyst and the crosslinking agent are used, it is preferred that the total amount is 30 parts by mass or less, more preferably 10 parts by mass or less, based on 100 parts by mass of the resin.

In order to enhance the compatibility of the particles with the resin, an additive having a high affinity with both of them can be added. For example, sugar type surfactants such as alkyl glucoside, alkyl maltoside, sucrose fatty acid ester, and glucoside fatty acid ester can be preferably used.

Finally, the hydrophilic coating material according to the present disclosure is applied to a desired base material to form a hydrophilic coating film as described later. Therefore, an organic solvent can be included, in order to obtain a coating solution suitable for coating. As the organic solvent, solvents which maintain the dispersibility of the particles of the alginic acid compound described above and in which the resin, the curing catalyst, or the crosslinking agent is uniformly dispersed or dissolved, are used. Specifically, from the viewpoint of the solubility and coatability of the resin material, ketone-based solvents such as methyl isobutyl ketone (MIBK) and propylene glycol monomethyl ether acetate (PGMEA) and alcohol-based solvents such as isopropyl alcohol (IPA) are preferably used. These organic solvents can be used alone or in combination of two or more.

(C) Manufacturing Step of Hydrophilic Coating Film

The hydrophilic coating film (also referred to as a cured film) can be produced by a method including the following steps:

(1) first, a step of applying the hydrophilic coating material according to the present disclosure on a substrate, and (2) A Step of Curing the Applied Hydrophilic Coating Material.

The application method in step (1) is not particularly limited as long as a uniform film can be formed. For example, a spin coating method or a slit coating method can be used. A concentration of the coating solution can also be appropriately adjusted according to the application method. A thickness of the layer (applied film) of the hydrophilic coating material formed in this step is not particularly limited, but may be from 15 µm to 75 µm, in consideration of the particle diameter of the particles. The thickness of the applied film means a dry film thickness obtained by drying the solvent. Further, a part of the film may be cured (semi-cured). Further, the thickness of the applied film may be the same as the thickness of a cured film described later, or may be thicker than the cured film.

Next, curing step (2) is performed. It is preferred that the curing step includes a step of removing the surface layer of the applied film to expose the alginic acid compound particles.

When a photocurable resin is used, a heating step is performed for main curing after exposure to a wavelength at which the curing reaction proceeds. At the time of the exposure, for the purpose of exposing the particles on a film surface to further express hydrophilicity, an exposure amount is suppressed, or the surface after the exposure is subjected to a treatment for suppressing surface curing such as dry fog humidification before the main curing step. When the exposure amount is suppressed, the lower limit is the exposure amount at which the mechanical strength of the resin is not impaired. When a radical-polymerizable resin is used as the photocurable resin, only the surface is inhibited from being cured, and then the surface may be scraped off by a development step, to expose the particles. As a developing solution, a chemical solution which can remove an insufficiently cured portion is preferred. The exposure can be performed under the atmosphere or under the inert gas atmosphere such as nitrogen ($N_2$).

When a thermocurable resin is used, a heating step is performed to perform the curing reaction. At this time, in order to expose the particles on the film surface in the same manner as described above, the surface of the hydrophilic coating material applied by a fan or the like may be cured by heating from the bottom surface of the substrate while being cooled. Thereafter, the surface layer which is not sufficiently thermally cured is scraped off with a suitable solvent, thereby exposing the particles. As the solvent, a solvent that can remove a portion of the thermocurable resin which is insufficiently thermally cured as described above, is preferred. Finally, if necessary, complete baking may be performed to accelerate the curing.

The thus-obtained hydrophilic coating film has an initial contact angle of 25° or less, preferably 20° or less, more preferably less than 10°, and still more preferably less than 5°, the initial contact angle being as described later. In addition, it is preferred that hydrophilicity is maintained, and in the wiping evaluation and storage evaluation described later, the coating film can maintain an initial contact angle of less than 40°, more preferably less than 20°, and still more preferably less than 10°, which is lower than the contact angle of the resin alone.

Hereinafter, an example in which the hydrophilic coating film according to the present disclosure is applied to a nozzle plate of an inkjet recording head will be described with reference to the drawings.

Figure 1B:
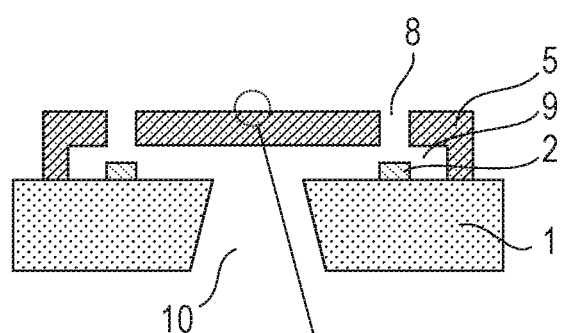
FIG. 1B is a schematic cross-sectional view of the inkjet recording head according to the present disclosure.
Figure 1C:
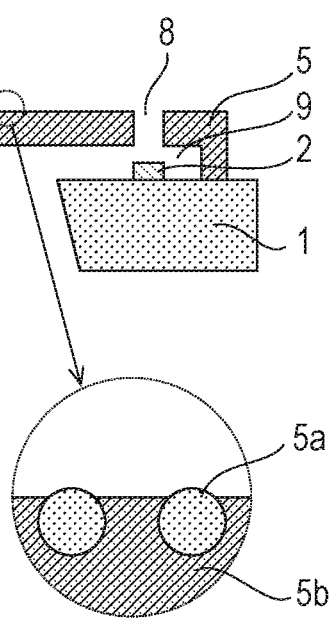
FIG. 1C is a partially enlarged view of a schematic cross-section of the inkjet recording head according to the present disclosure.

FIGS. 1A, 1B, and 1C are drawings for illustrating the configuration of an inkjet recording head, in which FIG. 1A is a partially cutaway perspective view, FIG. 1B is a schematic cross-sectional view taken along X-X' in FIG. 1A, and FIG. 1C illustrates a partially enlarged view of FIG. 1B.

First, as illustrated in FIGS. 1A, 1B and 1C, the inkjet recording head includes a nozzle plate 5 having an ejection port 8, on a substrate 1 for head having an energy generating element 2 which generates energy for ejecting ink (also simply referred to as a substrate). Further, an ink flow path 9 communicating with the ejection port 8 is provided so as to face a substrate surface on which the energy generating element is formed, and further, an ink supply port 10 for supplying ink to the ink flow path 9 is provided. The ink supply port 10 penetrates the substrate 1 and supplies ink from the surface opposite to the surface on which the nozzle plate 5 is formed.

The nozzle plate 5 has a hydrophilic coating film using the hydrophilic coating material according to the present disclosure. Though the drawing illustrates an example in which the hydrophilic coating film constitutes the entire nozzle plate, the present invention is not limited thereto, and may be partially formed thereby. For example, a member that defines the ink flow path may be formed of a negative type photoresist or the like, and then a hydrophilic coating film may be formed on the nozzle face surface to form a laminated structure. On the nozzle face surface, it is preferred that alginic acid compound particles 5a are partially exposed from a resin 5b as described above (see FIG. 1C). Even when the entire nozzle plate is made of a hydrophilic coating film, hydrophilicity can be changed between the nozzle face surface and the region other than the nozzle face surface (for example, the ink flow path) depending on whether the particles are exposed. Further, the entire nozzle face surface does not have to be a hydrophilic coating film, and a configuration in which a hydrophilic region and a water-repellent region are mixed may be employed. In this case, first, a hydrophilic coating film may be formed on the entire nozzle face surface and then patterned. Further, a water-repellent film may be partially formed on the hydrophilic coating film, so that a hydrophilic portion and a water-repellent portion are mixed on the nozzle face surface.

In order to remove ink attached to the nozzle face surface, the nozzle face surface may be wiped periodically or irregularly by a wiping unit such as a rubber blade. Since the hydrophilic coating film according to the present disclosure has excellent mechanical strength, deterioration of hydrophilicity can be suppressed even after such wiping.

EXAMPLES

Examples and Comparative examples are shown below, but the present invention is not limited thereto. For evaluation, hydrophilic coating films and inkjet recording heads (excluding Example 3 and Comparative Example 2) were manufactured, and their performance was evaluated. Table 1 lists the materials used and the manufacturing conditions. As the substrate used as an evaluation film, substrates made of any material such as a silicon substrate, a silicon substrate on which a thermal oxide film is formed, and a polyimide substrate can be used, but a silicon substrate was used. As a particle diameter measurement device, "Dynamic Light Scattering Photometer" (trade name) manufactured by OTSUKA Electronics Co., Ltd., and "Dynamic Light Scattering Particle Size Distribution Analyzer, LB500" manufactured by Horiba, Ltd. were used.

Example 1

<Preparation of Coating Solution of Hydrophilic Coating Material>

A hydrophilic coating material was prepared as follows.

First, alginate beads 1 (trade name: Flavica Fine SF-W, manufactured by Nisshinbo Chemical Inc.) were prepared as core particles. In 100 mL of a 1.25% chitosan solution prepared with 0.1 M acetic acid, 10.0 g of the core particles was immersed for 60 minutes and shaken. Furthermore, a high pressure and high temperature treatment was performed at 0.3 MPa, 120° C., and 30 minutes by an autoclave (TR-24S manufactured by ALP) to obtain core-shell particles coated with chitosan (step (A)). After being taken out of the autoclave, the particles were dried to obtain powder of core-shell particles.

Using propylene glycol monomethyl ether acetate (PG-MEA, manufactured by SHOWA DENKO K.K.) as a solvent, 5.0 g of the obtained powder, 100 g of an epoxy resin (trade name: EHPE3150, manufactured by Daicel Corporation), 2.0 g of a photocationic polymerization initiator (trade name: SP-172, manufactured by ADEKA Corporation), and 5.0 g of a silane agent (trade name: SILQUEST A-187J, manufactured by Momentive Performance Materials, Inc.) were stirred for 2 days to obtain a coating solution of a hydrophilic coating material (step (B)).

<Manufacture of Hydrophilic Coating Film>

Next, a hydrophilic coating film (evaluation sample) was manufactured by the following method.

The obtained coating solution of hydrophilic coating material was applied onto a substrate by a spin coating method so as to have a thickness of 15 μm, and subjected to a heat treatment at 90° C. for 5 minutes to form a coating film.

Next, the coating film on the substrate was exposed in the atmosphere at an exposure amount of 2500 J/m² by an exposure device (trade name: UX3000, manufactured by Ushio Inc.), and then subjected to humidification by dry fog. Thereafter, a heat treatment was performed at 90° C. for 4 minutes. Then, after performing a cleaning treatment using a mixed solution of methyl isobutyl ketone (MIBK) and xylene, a rinsing treatment was performed with isopropanol (IPA). Further, the coating film was cured by heating at 200° C. for 60 minutes to obtain a hydrophilic coating film.

<Manufacture of Inkjet Recording Head>

Next, an inkjet recording head was manufactured by the following method. The manufacture flow is illustrated in FIGS. 2A, 2B, 2C, 2D, and 2E.

Figure 2A:
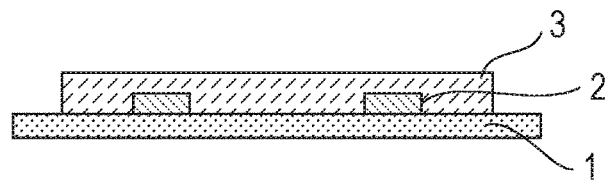
FIGS. 2A, 2B, 2C, 2D and 2E are process cross-sectional views illustrating a production flow of the inkjet recording head according to the present disclosure.
Figure 2B:
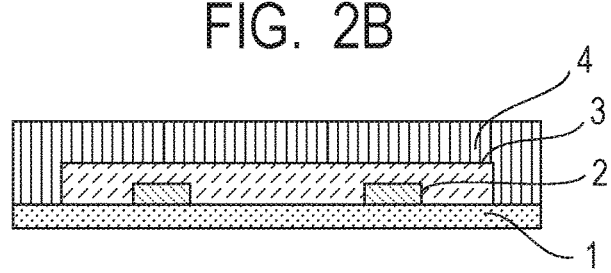

Polymethyl isopropenyl ketone (trade name "ODUR-1010", manufactured by TOKYO OHKA KOGYO CO., LTD.) as a positive type resist serving as a mold for the ink flow path was applied on the substrate 1 on which the energy generating element 2 was provided, so as to have a thickness of 14 μm, and was subjected to a heat treatment at 120° C. for 6 minutes. Next, the pattern of the ink flow path was exposed by an exposure device (trade name: UX3000, manufactured by Ushio Inc.), and developed by MIBK to form an ink flow path mold 3 (FIG. 2A). Next, as a resin layer 4 for forming the ejection port, on the ink flow path mold 3, the hydrophilic coating material was applied on the substrate so as to have a thickness of 25 μm from the base substrate 1. Subsequently, a heat treatment was performed at 90° C. for 5 minutes (FIG. 2B).

Figure 2C:
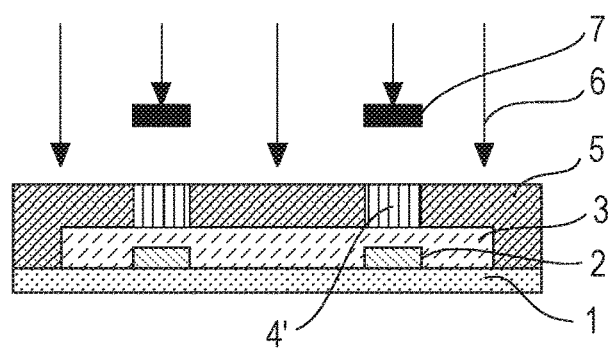

Next, an i-ray exposure stepper (manufactured by Canon Inc.) was used to perform exposure to radiation energy 6 of an irradiation amount of 2500 J/m² through the photomask 7 so that the ejection port forming portion becomes an unexposed portion 4' and an exposed portion becomes the orifice plate 5 (FIG. 2C). Further, after performing a humidification treatment by dry fog, a heat treatment was performed at 90° C. for 4 minutes.

Figure 2D:
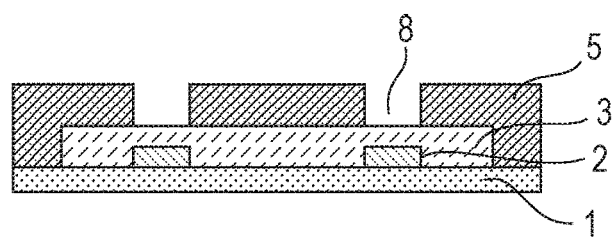

Next, development was performed with xylene/MIBK=6/4 to form the ejection port 8 (FIG. 2D).

Figure 2E:
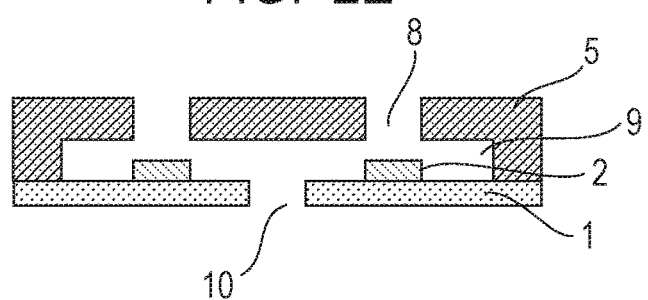

Further, a mask for manufacturing an ink supply port was appropriately arranged on the back surface of the substrate, the surface of the substrate was protected with a rubber film, and then the ink supply port 10 was manufactured by anisotropic etching of the silicon substrate. After the anisotropic etching was completed, the rubber film was removed, the above-described exposure device was used again to irradiate the entire surface with ultraviolet rays, thereby decomposing the ink flow path mold 3, and methyl lactate was used to dissolve and remove the positive type resist forming the mold 3, thereby forming the ink flow path 9 (FIG. 2E). In order to completely cure the orifice plate 5 (main curing), a heating process was performed at 200° C. for 1 hour, and then electrical connection and ink supply units were appropriately arranged to obtain an inkjet recording head.

Examples 2 and 4 to 10

<Preparation of Coating Solution of Hydrophilic Coating Material>

A coating solution of the hydrophilic coating material was prepared in the same manner as in Example 1, except that various conditions such as the type and particle size of alginic acid, the type of saccharide, the resin, the additive, and the addition amount were changed as shown in Table 1.

<Manufacture of Hydrophilic Coating Film and Inkjet Recording Head>

Hydrophilic coating films and inkjet recording heads were manufactured in the same manner as in Example 1, except that various conditions such as exposure conditions and heating conditions were changed as shown in Table 1.

Example 3

<Preparation of Coating Solution of Hydrophilic Coating Material>

A coating solution of hydrophilic coating material was prepared in the same manner as in Example 1, except that the type of the resin was changed to a thermocurable resin of a bisphenol A epoxy resin obtained from bisphenol A and epichlorohydrin, and various conditions were changed as shown in Table 1.

<Manufacture of Hydrophilic Coating Film>

A hydrophilic coating film was manufactured in the same manner as in Example 1, except that various conditions such as heating conditions were changed as shown in Table 1, without performing exposure and a treatment after exposure. In the heating step, the surface was treated with a water-cooled heat sink.

Examples 11 and 12

<Preparation of Coating Solution of Hydrophilic Coating Material>

Various conditions such as the resin, the additive, and the addition amount were changed as shown in Table 1 from the conditions in Example 1, and a coating solution of hydrophilic coating material was prepared. Unlike Example 1, the alginate particles were not core-shell particles but were dispersed in a resin.

<Manufacture of Hydrophilic Coating Film and Inkjet Recording Head>

Hydrophilic coating films and inkjet recording heads were manufactured in the same manner as in Example 1, except that various conditions such as exposure conditions and heating conditions were changed as shown in Table 1.

Example 13

<Preparation of Coating Solution of Hydrophilic Coating Material>

A coating solution of hydrophilic coating material was prepared in the same manner as in Example 1, except that the type of the resin was changed to a thermocurable resin of a resol type phenol resin obtained by reacting phenol and formaldehyde under a basic catalyst, and various conditions were changed as shown in Table 1.

<Manufacture of Hydrophilic Coating Film>

A hydrophilic coating film was manufactured in the same manner as in Example 1, except that various conditions such as heating conditions were changed as shown in Table 1, without performing exposure and a treatment after exposure.

Comparative Example 1

<Preparation of Coating Solution of Hydrophilic Coating Material>

A coating solution of hydrophilic coating material was prepared in the same manner as in Example 1, except that a surfactant (trade name: NSA-17, manufactured by Sanyo Chemical Industry Co., Ltd.) was added instead of alginate particles and various conditions were changed as shown in Table 1.

<Manufacture of Hydrophilic Coating Film and Inkjet Recording Head>

A hydrophilic coating film and an inkjet recording head were manufactured in the same manner as in Example 1, except that various conditions such as an exposure step and main curing were changed as shown in Table 1.

Comparative Example 2

<Preparation of Coating Solution of Hydrophilic Coating Material>

A coating solution of hydrophilic coating material was prepared in the same manner as in Example 1, except that a surfactant (trade name: NSA-17, manufactured by Sanyo Chemical Industry Co., Ltd.) was used instead of adding alginate particles and a resin and various conditions were changed as shown in Table 1.

<Manufacture of Hydrophilic Coating Film and Inkjet Recording Head>

A hydrophilic coating film and an inkjet recording head were manufactured in the same manner as in Example 1, except that an exposure step and a treatment after the exposure step were not performed and various conditions such as heating conditions were changed as shown in Table 1.

Comparative Example 3

<Preparation of Coating Solution of Coating Material>

A coating solution of coating material was prepared without using a hydrophilic material.

<Manufacture of Coating Film and Inkjet Recording Head>

A coating film and an inkjet recording head were manufactured in the same manner as in Example 1, except that various conditions such as an exposure step and main curing were changed as shown in Table 1.

<Measurement and Evaluation>

(Exposure and Non-Exposure of Particles)

In Examples, whether the alginate particles were exposed was confirmed and evaluated under a microscope. Since the particles were not added in the Comparative Example, observation was not performed.

(Initial Hydrophilicity)

In order to evaluate the hydrophilicity of the manufactured hydrophilic coating film, a micro contact angle meter (product name: DropMeasure, manufactured by Microjet Corporation) was used to measure a dynamic receding contact angle θr (°) with respect to pure water. The results are shown in Table 1 as "initial_contact angle". Further, the water contact angle of a cured product of the resin alone described later was measured in the same manner.

(Wiping Evaluation)

For the wiping test, a diamond chip having a tip diameter of 15 μm was used as a scratching body, and reciprocally rubbed 10 times so that a pressing load between the scratching body and the ejection port surface of the inkjet recording head or the sample surface is 10 gf. For the wiped sample, the dynamic receding contact angle with respect to pure water was measured in the same manner as described above. The results are shown in Table 1 as "after wiping_contact angle".

(Preservation Evaluation)

As evaluation of storage stability, the dynamic receding contact angle with respect to pure water was measured in the same manner as described above, for the hydrophilic coating films according to Examples and Comparative Examples and the samples after storage under the environment at 70° C. for 3 months. The results are shown in Table 1 as "after high-temperature storage_contact angle".

(Evaluation of Inkjet Recording Head)

As evaluation of the manufactured inkjet recording head, printing characteristics after a scratch test were confirmed.

Examples 1, 2, and 4 to 13: good printing quality was exhibited.

Comparative Example 1: Many print kinks occurred, and image quality was greatly reduced.

The evaluation criteria for the initial hydrophilicity and hydrophilicity persistence are as follows.

Initial Hydrophilicity

A: "Initial_contact angle is less than 5°"

B: "Initial_contact angle is 5° or more and less than 10°"

C: "Initial_contact angle is 10° or more and 20° or less"

D: "Initial_contact angle is more than 20°"

Hydrophilic Persistence

A: "After wiping_contact angle and after high-temperature storage_contact angle are both less than 10°"

B: "Either of after wiping_contact angle and after high-temperature storage_contact angle is 10° or more and less than 20°"

C: "Either of after wiping_contact angle and after high-temperature storage_contact angle is 20° or more and less than 40°"

D: "Either of after wiping_contact angle and after high-temperature storage_contact angle is 40° or more"

TABLE 1

| | | Example 1 | Example 2 | Example 3 | Example 4 | Example 5 | Example 6 | Example 7 | Example 8 | Example 9 | Example 10 | Example 11 | Example 12 | Example 13 | Comparative Example 1 | Comparative Example 2 | Comparative Example 3 |
|---|---|---|---|---|---|---|---|---|---|---|---|---|---|---|---|---|---|
| Alginate particles | Core: alginic acid (salt) Shell: saccharide | Chitosan | Phosphori-bosylamine | Chitosan | Chitosan | Chitosan | Chitosan | Chitosan | Chitosan | Chitosan | Chitosan | | Alginate powder | Alginate beads 1 | | | |
| | | Alginate beads 1 | | | Alginate beads 1 | | | Alginate beads 2 | | Alginate beads 1 | Alginate beads 1 | | | | | | |
| | Particle diameter (μm) | 5 | 5 | | 5 | 5 | 5 | 20 | 5 | 5 | 5 | 5 | 20 | 5 | | | |
| | Addition amount (parts) | 5 | 5 | 5 | 5 | 5 | 5 | 5 | 5 | 5 | 5 | 5 | 5 | 5 | | | |
| Resin | Type | Epoxy | Epoxy | BP-A/ECH | Epoxy | Epoxy | Epoxy | Epoxy | Epoxy | Acryl | Acryl | Epoxy | Epoxy | Phenol/formaldehyde | Epoxy | | |
| | Addition amount (parts) | 100 | 100 | 50/50 | 100 | 100 | 100 | 100 | 100 | 100 | 100 | 100 | 100 | 50/50 | 100 | | |
| Polymerization initiator | Type | | SP-170 | SP-170 | SP-170 | SP-170 | SP-170 | SP-170 | SP-170 | BP | BP | SP-170 | SP-171 | | SP-172 | | |
| | Addition amount (parts) | | 2.0 | | 2.0 | 2.0 | 2.0 | 2.0 | 2.0 | 2.0 | 2.0 | 2.0 | 2.0 | 2.0 | 2.0 | | |
| Additive | Type | A-187J | A-187J | | | NSA-17 | A-187J | A-187J | A-187J | A-187J | A-187J | A-187J | A-187J | A-187J | NSA-17 | NSA-17 | |
| | Addition amount (parts) | 5.0 | 5.0 | | | 5.0 | 5.0 | 5.0 | 5.0 | 5.0 | 5.0 | 5.0 | 5.0 | 5.0 | 5.0 | 5.0 | |
| Solvent | Type | PGMEA | PGMEA | PGMEA | PGMEA | PGMEA | PGMEA | PGMEA | PGMEA | PGMEA | PGMEA | PGMEA | PGMEA | PGMEA | PGMEA | Ethanol | Ethanol |
| | Addition amount (parts) | 100 | 100 | 100 | 100 | 100 | 100 | 100 | 100 | 100 | 100 | 100 | 100 | 100 | 100 | 95 | 95 |
| Thickness (μm) | | 15 | 15 | 15 | 15 | 15 | 15 | 75 | 15 | 15 | 15 | 15 | 15 | 15 | 15 | 15 | 15 |
| Exposure step | Atmosphere | Under atmosphere | Under atmosphere | | | | Under atmosphere | Under atmosphere | Under atmosphere | | Under N₂ atmosphere | | Under atmosphere | | | | |
| | Exposure amount (J/cm²) | 2500 | 2500 | | | | | 2500 | | | | | | | | | |
| Treatment after exposure | | Dry fog humidification | Dry fog humidification | | | Dry fog humidification | Dry fog humidification | Dry fog humidification | | | | Dry fog humidification | | | | | |
| Main curing | | | | | | | | | 200° C., 60 minutes | | | | | | | | |
| | | | | | | | | | Manufacture of sample film for evaluation | | | | | | | | |
| | | | | | | | | | Evaluation | | | | | | | | |
| Whether particles were exposed or unexposed | | Exposed | Exposed | Exposed | Exposed | Exposed | Exposed | Exposed | Unexposed | Unexposed | Unexposed | Exposed | Exposed | Unexposed | | | |
| Initial_contact angle[°] | | 3 | 3 | 3 | 3 | 3 | 3 | 3 | 6 | 7 | 8 | 9 | 20 | 9 | 9 | 9 | 60 |
| Initial hydrophilicity evaluation determination | | A | A | A | A | A | A | A | B | B | B | B | C | B | B | B | D |
| After wiping_contact angle[°] | | 6 | 6 | 8 | 7 | 8 | 8 | 12 | 15 | 15 | 10 | 19 | 30 | 12 | 61 | 55 | 61 |
| After high-temperature storage_contact angle[°] | | 9 | 9 | 9 | 9 | 9 | 5 | 12 | 15 | 15 | 10 | 18 | 32 | 12 | 62 | 58 | 62 |
| Hydrophilic persistence evaluation determination | | A | A | A | A | A | A | B | B | B | B | B | C | B | D | D | D |

The references in the table are as follows:
"Alginate beads 1": (calcium alginate, trade name: Flavica Fine SF-W, manufactured by Nisshinbo Chemical Inc.)
"Alginate beads 2": (calcium alginate, trade name: Flavica Fine S, manufactured by Nisshinbo Chemical Inc.)
"Alginate powder": (alginic acid, manufactured by Kimika Corporation)
"Epoxy": epoxy resin (trade name: EHPE3150, manufactured by Daicel Corporation, water contact angle of cured film of resin alone=60°)
"BP-A/ECH": "bisphenol A/epichlorohydrin" (bisphenol A type epoxy resin raw material, water contact angle of cured film of resin alone=70°)
"Acrylic": acryl resin (trade name: Aronix UVX-6388, manufactured by TOAGOSEI CO., LTD., water contact angle of cured film of resin alone=50°)
"SP-170": photocationic polymerization initiator (trade name: ADEKA OPTOMER SP-170, manufactured by ADEKA Corporation)
"BP": benzophenone, photoradical polymerization initiator
"A-187J": silane agent (trade name: SILQUEST A-187J, manufactured by Momentive Performance Materials, Inc.)
"NSA-17": surfactant (trade name: NSA-17, manufactured by Sanyo Chemical Industry Co., Ltd.)
"Phenol/formaldehyde": phenol resin material (trade name: KM-220 (J), manufactured by KYOCERA Corporation)/formaldehyde (formaldehyde solution (37%), manufactured by Kishida Chemical Co., Ltd.) [resol type phenol resin, water contact angle of the cured film of the obtained resin alone=70° ]
"Basic catalyst": (trade name: Benzoguanamine, manufactured by Nippon Shokubai Co., Ltd.)

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-118519, filed Jun. 26, 2019, which is hereby incorporated by reference herein in its entirety.

What is claimed is:

1. A hydrophilic coating material comprising an alginic acid compound and a resin,
    wherein the resin is selected such that a cured product of the resin alone has a water contact angle of 40° or more.

2. The hydrophilic coating material according to claim 1, wherein the alginic acid compound is granulated and dispersed in the resin.

3. The hydrophilic coating material according to claim 2, wherein the alginic acid compound is an alginate containing a divalent metal ion.

4. The hydrophilic coating material according to claim 3, wherein the divalent metal ion is a strontium ion or a calcium ion.

5. The hydrophilic coating material according to claim 2, including core-shell particles in which core particles of the alginic acid compound are coated with a saccharide.

6. The hydrophilic coating material according to claim 2, wherein particles formed of the alginic acid compound have a particle diameter of 10 μm or less.

7. The hydrophilic coating material according to claim 5, wherein the saccharide has a hydroxyl value in a monosaccharide or a hydroxyl value in a monomer unit in a polysaccharide of 3 or less.

8. The hydrophilic coating material according to claim 5, wherein the saccharide is chitosan or phosphoribosylamine.

9. The hydrophilic coating material according to claim 1, wherein the resin includes at least one of a thermocurable resin or a photocurable resin.

10. The hydrophilic coating material according to claim 9, wherein the thermocurable resin includes at least one of an epoxy resin or a phenol resin.

11. The hydrophilic coating material according to claim 9, wherein the thermocurable resin is a bisphenol A type epoxy resin.

12. The hydrophilic coating material according to claim 9, wherein the thermocurable resin is a resol type phenol resin.

13. The hydrophilic coating material according to claim 9, wherein the photocurable resin is at least one member selected from the group consisting of an acryl resin, an alicyclic type epoxy resin, and a novolak type epoxy resin.

14. The hydrophilic coating material according to claim 1, further comprising at least one of a curing catalyst or a crosslinking agent.

15. The hydrophilic coating material according to claim 14, wherein the curing catalyst is non-basic.

16. The hydrophilic coating material according to claim 14, wherein the crosslinking agent is non-basic.

17. The hydrophilic coating material according to claim 1, further comprising an organic solvent.

18. The hydrophilic coating material according to claim 17, wherein the organic solvent is at least one organic solvent selected from the group consisting of ketone-based solvents and alcohol-based solvents.

19. A method of producing a hydrophilic coating film, comprising
    applying a hydrophilic coating material on a substrate; and
    curing the applied hydrophilic coating material,
    wherein the hydrophilic coating material includes an alginic acid compound and a resin, and
    the resin is selected such that a cured product of the resin alone has a water contact angle of 40° or more.

20. An inkjet recording head comprising a cured film of a hydrophilic coating material, wherein
    the hydrophilic coating material includes an alginic acid compound and a resin, and
    the resin is selected such that a cured product of the resin alone has a water contact angle of 40° or more.

* * * * *